United States Patent
Dyson et al.

(10) Patent No.: US 9,155,431 B2
(45) Date of Patent: Oct. 13, 2015

(54) VACUUM CLEANER ARRANGEMENT

(75) Inventors: James Dyson, Malmesbury (GB); Timothy Nicholas Stickney, Malmesbury (GB); Peter David Gammack, Malmesbury (GB); Michael John Cox, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 1079 days.

(21) Appl. No.: 13/035,615

(22) Filed: Feb. 25, 2011

(65) Prior Publication Data

US 2011/0219566 A1 Sep. 15, 2011

(30) Foreign Application Priority Data

Mar. 12, 2010 (GB) .................................. 1004149.9
Aug. 31, 2010 (GB) .................................. 1014423.6

(51) Int. Cl.
| A47L 9/00 | (2006.01) |
|---|---|
| A47L 9/28 | (2006.01) |
| A47L 5/24 | (2006.01) |
| H02J 7/00 | (2006.01) |

(52) U.S. Cl.
CPC .................. *A47L 5/24* (2013.01); *A47L 9/0063* (2013.01); *A47L 9/2873* (2013.01); *H02J 7/0044* (2013.01)

(58) Field of Classification Search
CPC ........... H02J 7/044; H02J 9/2873; H02J 5/24; H02J 9/0063; G06F 1/1632
USPC ....... 15/323, 339, 344, DIG. 1; 248/110, 200, 248/300, 309.1, 316.1, 316.8
See application file for complete search history.

(56) References Cited

U.S. PATENT DOCUMENTS

| 4,225,814 | A | * | 9/1980 | Gantz et al. .................... 320/115 |
|---|---|---|---|---|
| D280,033 | S | | 8/1985 | Miyamoto et al. |
| 4,670,701 | A | * | 6/1987 | Sako et al. ..................... 320/115 |
| 4,739,242 | A | * | 4/1988 | McCarty et al. ............... 320/110 |
| D298,875 | S | | 12/1988 | Nakamura |
| D303,173 | S | | 8/1989 | Miyamoto et al. |
| 4,934,020 | A | * | 6/1990 | Jackson .......................... 15/339 |
| 4,956,892 | A | * | 9/1990 | Fawkes ........................... 15/339 |
| 4,964,472 | A | * | 10/1990 | Cleworth ........................ 171/11 |
| 5,005,252 | A | * | 4/1991 | Steiner et al. .................. 15/339 |

(Continued)

FOREIGN PATENT DOCUMENTS

| CN | 1145454 | 4/2004 |
|---|---|---|
| EP | 100438 A2 * | 2/1984 |

(Continued)

OTHER PUBLICATIONS

GB Search Report dated Jul. 9, 2010, directed to GB Patent Application No. 1004149.9; 1 page.

(Continued)

*Primary Examiner* — Joseph J Hail
*Assistant Examiner* — Joel Crandall
(74) *Attorney, Agent, or Firm* — Morrison & Foerster LLP

(57) ABSTRACT

An arrangement including: a handheld suction unit in combination with an elongate suction wand to form a stick-vac cleaner, the arrangement further including a wall-mountable docking station for supporting the stick-vac cleaner on a wall in an upright, docked position when not in use. The arrangement provides for relatively stable storage of the stick-vac cleaner in the upright position, convenient for use.

9 Claims, 14 Drawing Sheets

(56) References Cited

U.S. PATENT DOCUMENTS

| | | | |
|---|---|---|---|
| 5,035,024 A | | 7/1991 | Steiner et al. |
| 5,256,955 A | * | 10/1993 | Tomura et al. ............... 320/110 |
| 5,394,073 A | * | 2/1995 | Nagai ........................... 320/115 |
| 5,664,282 A | * | 9/1997 | Castwall et al. ................ 15/319 |
| 6,049,944 A | * | 4/2000 | Lopez ............................ 15/344 |
| 6,125,498 A | | 10/2000 | Roberts et al. |
| 6,716,058 B2 | * | 4/2004 | Youn ............................ 439/535 |
| 6,926,130 B2 | * | 8/2005 | Skowronski ............. 191/12.2 R |
| 7,166,987 B2 | * | 1/2007 | Lee et al. ...................... 320/114 |
| 7,404,230 B1 | | 7/2008 | Phillips |
| 7,636,975 B2 | * | 12/2009 | Mah et al. ........................ 15/1.7 |
| 8,302,250 B2 | * | 11/2012 | Dyson et al. ................. 15/327.1 |
| 8,351,195 B2 | * | 1/2013 | Huang ..................... 361/679.31 |
| 2005/0111182 A1 | * | 5/2005 | Lin et al. ........................ 361/686 |
| 2006/0238507 A1 | * | 10/2006 | Chang ........................... 345/163 |
| 2007/0152633 A1 | * | 7/2007 | Lee ................................ 320/114 |
| 2008/0040883 A1 | | 2/2008 | Beskow et al. |
| 2009/0015195 A1 | * | 1/2009 | Loth-Krausser ............. 320/107 |
| 2011/0197389 A1 | * | 8/2011 | Ota et al. ........................ 15/339 |
| 2011/0219571 A1 | | 9/2011 | Dyson et al. |

FOREIGN PATENT DOCUMENTS

| | | | |
|---|---|---|---|
| GB | 2 268 875 | | 1/1994 |
| GB | 2 377 880 | | 1/2003 |
| GB | 2 441 962 | | 3/2008 |
| JP | 61-131720 | | 6/1986 |
| JP | 63-25942 | | 2/1988 |
| JP | 64-15020 | | 1/1989 |
| JP | 03272720 A | * | 12/1991 |
| JP | 11-506352 | | 6/1999 |
| JP | 2002000527 A | * | 1/2002 |
| JP | 2002-153402 | | 5/2002 |
| JP | 2003284656 A | * | 10/2003 |
| WO | WO-96/22724 | | 8/1996 |
| WO | WO 2009156555 A1 | * | 12/2009 |

OTHER PUBLICATIONS

GB Search Report dated Nov. 30, 2010, directed to GB Patent Application No. 1014423.6; 1 page.

International Search Report and Written Opinion mailed Mar. 29, 2011, directed to counterpart International Application No. PCT/GB2011/050186; 14 pages.

Dyson et al., Office Action mailed Nov. 22, 2013, directed to U.S. Appl. No. 13/035,612; 11 pages.

* cited by examiner

VACUUM CLEANER ARRANGEMENT

REFERENCE TO RELATED APPLICATIONS

This application claims the priority of United Kingdom Application No. 1004149.9, filed 12 Mar. 2010, and of United Kingdom Application No. 1014423.6, filed 31 Aug. 2010, the entire contents each of which are incorporated herein by reference.

FIELD OF THE INVENTION

The present invention relates to the field of vacuum cleaners, and more specifically to 'stick-vac' cleaners of the type generally comprising a handheld suction unit connected to a floor tool by an elongate suction wand.

BACKGROUND OF THE INVENTION

Broadly speaking, there are four types of vacuum cleaner: "upright" vacuum cleaners, "cylinder" cleaners (also referred to as "canister" cleaners), "handheld" vacuum cleaners and "stick" vacuum cleaners, the latter being popularly referred to as "stick-vac" cleaners, or simply "stick-vacs".

Upright cleaners and cylinder cleaners are well known. They tend to be mains-operated and are used for relatively heavy-duty cleaning applications.

Handheld vacuum cleaners are relatively small, highly portable vacuum cleaners, best suited to relatively low duty applications such as spot cleaning floors and upholstery in the home, interior cleaning of cars and boats etc. Unlike upright cleaners and cylinder cleaners, they are designed to be carried in the hand during use, and tend to be battery-operated.

Stick-vac cleaners essentially offer a lightweight, functional alternative to upright cleaners for relatively low duty floor-cleaning applications, such as cleaning up floor spills.

Broadly speaking, there are two types of stick-vacs. The first type is, in a sense, an ultra slim-line upright cleaner, though usually "cordless" rather than mains-operated. An example of this type of stick-vac cleaner is shown in UK Patent Application No. GB2377880A1, in this case additionally incorporating a removable, handheld vacuum-cleaning unit. Stick-vacs of this first type may be free-standing; otherwise, they tend to be stored simply by leaning the stick-vac against a wall when not in use (in the manner of a long-handle brush or broom).

The second type of stick-vac cleaner is a spin-off from the handheld vacuum cleaner, and comprises a handheld suction unit which is carried in the hand in the same way as a handheld vacuum cleaner, but in combination with a rigid, elongate suction wand which effectively reaches down to the floor so that the user may remain standing while cleaning a floor surface. A floor tool is typically attached to the end of the rigid, elongate suction wand, or alternatively may be integrated with the bottom end of the wand. Designs of this type of stick-vac cleaner are shown in U.S. D298875, U.S. D303173 and U.S. D280033. In each case, the handheld suction unit incorporates the motor, the fan and some sort of separating apparatus, which may be a bag or a cyclonic separation system.

Stick-vac cleaners of the second type are predominantly multi-mode, hybrid machines: in such cases, the wand is removable and the handheld suction unit may then be used independently as a handheld vacuum cleaner, as desired. However, this is not an essential feature of these types of stick-vac cleaners and it is conceivable that the wand may be permanently attached to the handheld suction unit.

A feature which distinguishes stick-vacs of the second type from stick-vacs of the first type is that the first type is "bottom heavy"—the motor is located low down in similar manner to a full-sized upright cleaner—whereas the second type is "top heavy"—the use of a handheld suction unit in combination with an elongate suction wand means that the motor (being inside the handheld suction unit) is located nearer the top end of the machine.

The "top heavy" distribution of weight in stick-vacs of the second type means that they are not particularly convenient to store in stick-vac mode. If the stick-vac cleaner is leaned against a wall in an upright position with the floor tool supported on the floor and the handheld suction unit resting against the wall, the relative weight of the handheld suction unit tends to make the stick-vac cleaner as a whole unstable. On the other hand, if the stick-vac cleaner is turned upside down and leaned against the wall with the relatively heavy handheld vacuum cleaner supported on the floor, the relatively dirty lower end of the cleaner will consequently rest against the wall, which is undesirable. Also, when the stick-vac cleaner is stored in an upside down position rather than an upright position, the natural inclination is to grasp the stick-vac cleaner in the region of the relatively dirty lower end of the stick-vac cleaner in order to turn the cleaner back round to the upright position for use.

Consequently, conventional stick-vac cleaners of the second type often tend to be stored on the floor or, where there is insufficient space to do so, tend to be partly disassembled for storage after use and then reassembled again when it is desired to use the machine in stick-vac mode. The need for disassembly and reassembly in particular discourages use of the machine in stick-vac mode.

SUMMARY OF THE INVENTION

According to the present invention, there is provided an arrangement comprising: a handheld suction unit in combination with an elongate suction wand to form a stick-vac cleaner, the arrangement further comprising a wall-mountable docking station for supporting the stick-vac cleaner on a wall in an upright, docked position when not in use.

By "upright position" is meant a position in which the elongate suction wand extends downwardly from the handheld suction unit towards the floor. Storing the stick-vac cleaner in the upright position has the advantage that a user may conveniently grasp the hand held vacuum cleaner in order to disengage the stick-vac from the docking station, at which point the stick-vac is ready for use in the upright position: there is no tendency for the user to grasp the relatively dirty, lower end of the stick-vac in order to manipulate the stick-vac cleaner into the upright position for use. At the same time, the "top heavy" stick-vac cleaner is advantageously supported in a relatively stable, upright position by the docking station (which laterally supports the stick-vac cleaner in the upright position).

In a particularly stable arrangement, the docking station is arranged releasably to lock the stick-vac in the upright, docked position i.e. so that the stick-vac cleaner is essentially fixed relative to the docking station in the upright, docked position.

The docking station may be arranged for engaging the handheld suction unit in order directly to support the hand held suction unit when the stick-vac cleaner is in the upright, docked position. Consequently, because the center of mass is dictated largely by the position of motor, which is inside the handheld suction unit, the center of mass of the stick-vac cleaner will be relatively near to the point of support on the wall; this provides a particularly stable upright, docked position, and results in relatively low stresses on the docking station components.

The handheld cleaner may be a battery-powered handheld cleaner, in which case it may incorporate a set of exterior charging contacts connected to an onboard rechargeable battery, and the docking station may comprise a respective set of charging contacts for connection to a mains supply, the charging contacts on the docking station being arranged for engagement with said exterior charging contacts on the handheld cleaner to form a battery-charging circuit when the stick-vac cleaner is in the upright, docked position. Thus, the docking station advantageously charges the battery onboard the handheld unit when the stick-vac cleaner is in the upright, docked position.

The charging contacts on the handheld suction unit may be arranged in any suitable manner. In some cases, it may be desirable to arrange the contacts on the handheld suction unit in a way which means that the contacts face upwards when the stick-vac cleaner is in the upright position.

If the charging contacts on the handheld suction unit are arranged so that they face upwards when the stick-vac cleaner is in the upright position, it has been found that there can be a tendency for the charging contacts to pull away from the respective contacts on the docking station, under the weight of the stick-vac cleaner. To address this problem, the charging contacts on the docking station may be spring-biased for urging the charging contacts downwardly into engagement with said upward-facing charging contacts on the handheld suction unit.

The docking station may comprise a catch for engaging the handheld suction unit part to secure the stick-vac cleaner in the upright, docked position, the catch being arranged to hold the charging contacts on the handheld suction unit in engagement with the charging contacts on the docking station. Thus, reliable contact is ensured for charging the battery when the stick-vac cleaner is in the upright, docked position.

The catch may be spring-loaded for urging the charging contacts on the handheld suction unit into engagement with the charging contacts on the docking station. This may be in addition to, or alternative to, the charging contacts on the docking station being spring-loaded as mentioned above.

The docking station may comprise an opposing pair of clamping members, at least one of the clamping members being resiliently biased towards the other clamping member for resiliently clamping the stick-vac against the other clamping member to lock the stick-vac in the upright, docked position. This provides a particularly stable arrangement, wherein the stick-vac is clamped securely in the upright, docked position.

Furthermore, docking and release of the cleaner is essentially one-handed, as described in more detail below.

The pair of clamping members may consist of a lower clamping member arranged for clamping upwardly against a respective lower part of the handheld suction unit and an opposing, upper clamping member arranged for clamping downwardly against a respective upper part of the handheld suction unit. This has the advantage that the clamping load on the cleaner is in direct opposition to the force of gravity.

In a particular arrangement, the lower clamping member is fixed in use, relative to the wall, and the upper clamping member is resiliently biased downwards towards the lower clamping member.

The clamping members may be arranged for relative sliding movement along a clamp axis to engage the stick-vac, with at least one clamping member additionally arranged for movement into and out of clamping alignment with the other clamping member. The ability to take a clamping member out of clamping alignment with the other clamping member allows for sequential engagement of the cleaner with the clamping members, which makes docking more convenient. The movement of the clamping member into and out of clamping alignment may be a pivoting movement. In particular, in use with the docking station mounted on a wall, said pivotable clamping member may be arranged such that, when the docking station is in use mounted on a wall, the clamping member is arranged for pivoting movement away from the wall. This latter arrangement is considered particularly advantageous in reducing the footprint of the docking station on the wall, because the pivotable clamping member moves within the footprint of the docking station.

In a particularly stable arrangement for locking the cleaner in the upright position, the upper clamping member is in the form of a docking cradle arranged to receive a first part of the handheld unit in a sliding fit, the docking cradle being slidable relative to the lower clamping member and resiliently biased towards the lower clamping member, the docking cradle additionally being pivotable away from the wall, in use, for movement out of clamping alignment with the lower clamping member in order to receive said first part of the handheld unit. In this case, the lower clamping member may be a fixed clamping member comprising a locking element for engagement with a second part of the handheld unit to secure the stick-vac against lateral movement relative to the lower clamping member.

BRIEF DESCRIPTION OF THE DRAWINGS

Embodiments of the invention will now be described with reference to the accompanying drawings, in which.

DETAILED DESCRIPTION OF THE INVENTION

Figure 1:
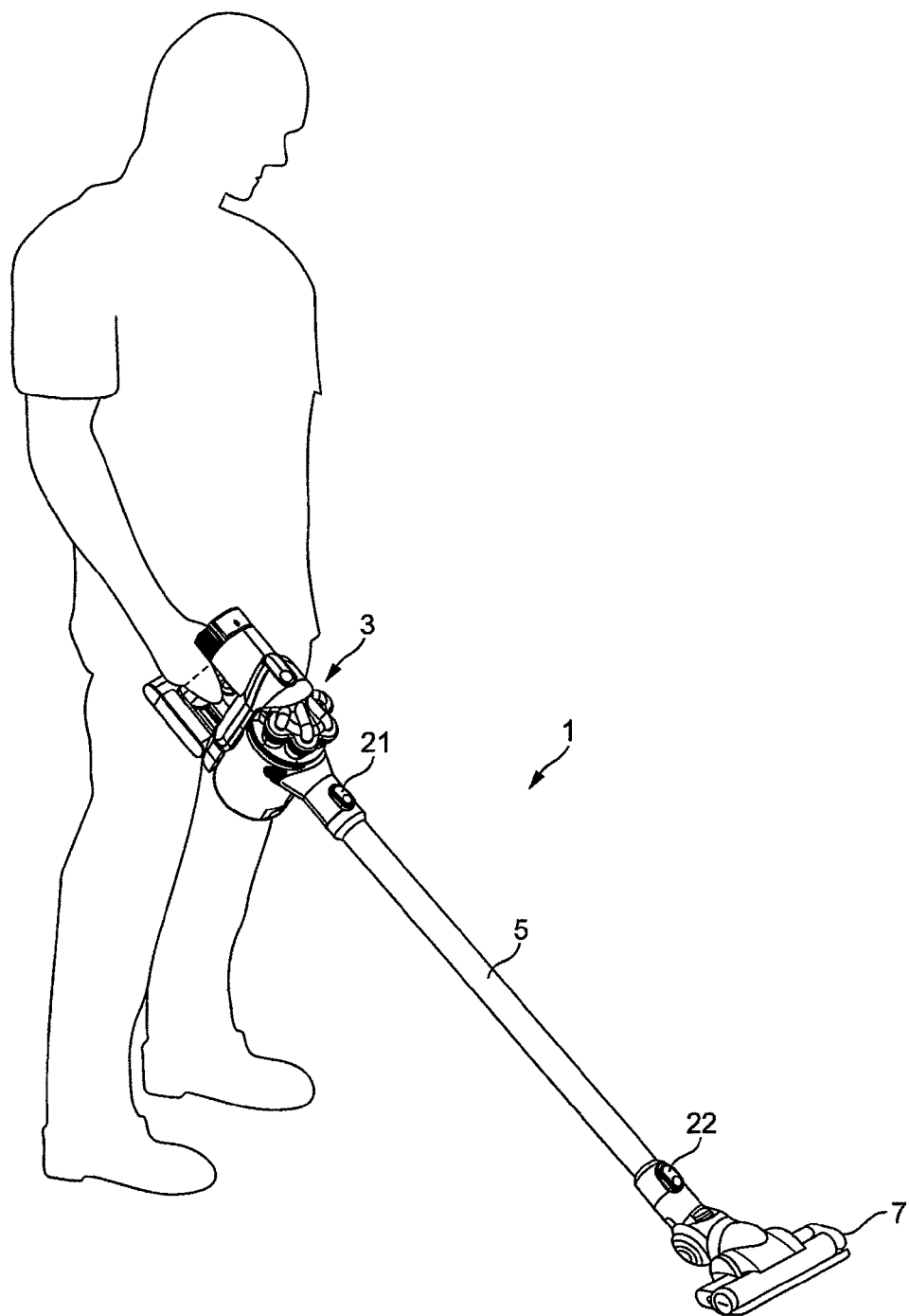
FIG. 1 is a schematic view showing a stick-vac cleaner in use.

FIG. 1 shows a stick-vac cleaner 1 comprising a hand held suction unit, in the form of a handheld vacuum cleaner 3, an elongate wand 5 and a floor tool 7.

Figure 2:
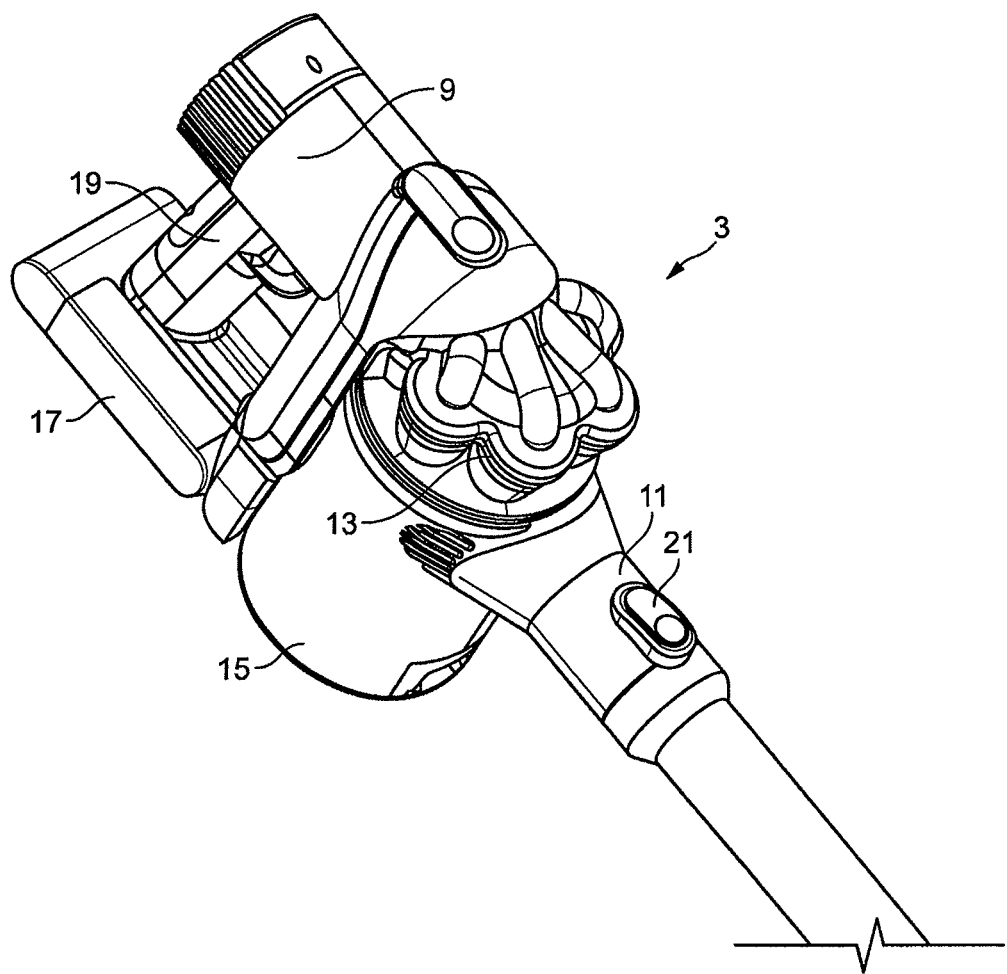
FIG. 2 is a close-up perspective view of part of the stick-vac cleaner in FIG. 1.

Referring to FIG. 2, the handheld vacuum cleaner 3 comprises a motor-driven fan which is arranged inside a motor casing 9 for drawing air in through a suction nozzle 11 positioned at the front of the hand held vacuum cleaner 3. Dirty air drawn in through the suction nozzle 11 is ducted under the fan-generated suction pressure through a cyclonic separation system 13, where dirt is separated from the air, before the relatively clean air is then exhausted back to atmosphere via one or more fine-particulate filters (not visible). The dirt which is separated from the airflow inside the cyclonic separating system 13 is collected in a bin 15 for disposal. The hand held vacuum cleaner 3 is powered by a multi-cell rechargeable battery which is housed in a battery pack 17.

In use, the handheld vacuum cleaner 3 is carried in the hand using a handle 19.

The handheld cleaner 3 is relatively compact. Nevertheless, to promote a balanced feel in the hand, the heavier components such as the motor and the battery pack 17 are deliberately located relatively close to the handle 19 and the relatively light components such as the bin 15 are located further away from the handle 19. Thus, the bulk of the mass of the handheld cleaner 3 is distributed towards the rear of the handheld cleaner 3.

The elongate wand 5 is connected to the suction nozzle 11, and the floor tool 7 is in turn connected to the lower end of the wand 5. Dirty air is drawn in through a suction opening on the underside of the floor tool 5 and passes to the suction nozzle 11 via the wand 5.

A catch 21 is provided for disconnecting the wand 5 from the handheld cleaner 3, so that the handheld cleaner 3 can be used as a handheld cleaner rather than as part of the stick-vac cleaner 1. A catch 22 is also provided for disconnecting the floor tool 7 from the wand 5, so that rather than being used as part of the stick-vac cleaner 1, the handheld cleaner 3 and wand 5 can alternatively be used in combination with some other suction tool to form a "long-reach" handheld vacuum cleaner for cleaning into the upper corners of a room etc.

The stick-vac cleaner 1 is "top-heavy", and conventionally this type of stick-vac cleaner has been awkward to store when it is not in use. If the stick-vac cleaner 1 is propped up against a wall in the upright position, with the floor tool 7 supported on the floor and the handheld cleaner 3 resting against the wall, the stick-vac cleaner 1 as a whole tends to be relatively unstable; on the other hand, if the stick-vac cleaner 1 is propped up against a wall upside down, with the handheld cleaner 3 supported on the floor and the floor tool 7 resting against the wall, the inclination is for a user to grasp the relatively dirty floor tool 7 in order to manipulate the stick-vac cleaner 1 back to the upright position for use. The relatively dirty floor tool 7 may also mark the wall.

Figure 3:
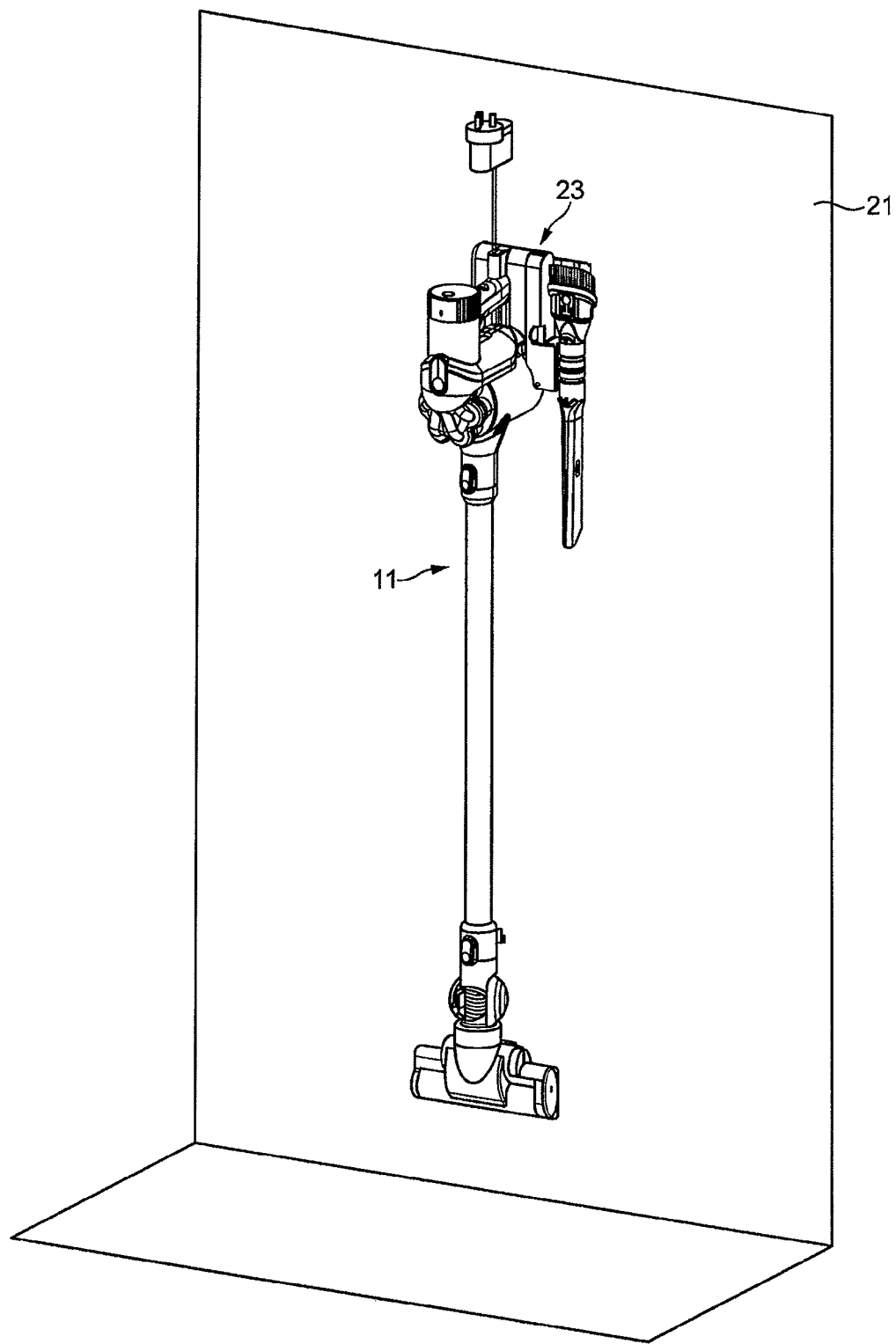
FIG. 3 is a perspective view showing a stick-vac cleaner supported on a wall by a docking station.

FIG. 3 illustrates an arrangement for conveniently storing the stick-vac cleaner 1 when it is not in use, in which the stick-vac cleaner 1 is supported in an upright position on a wall 21 by a wall-mounted docking station 23.

Figure 4:
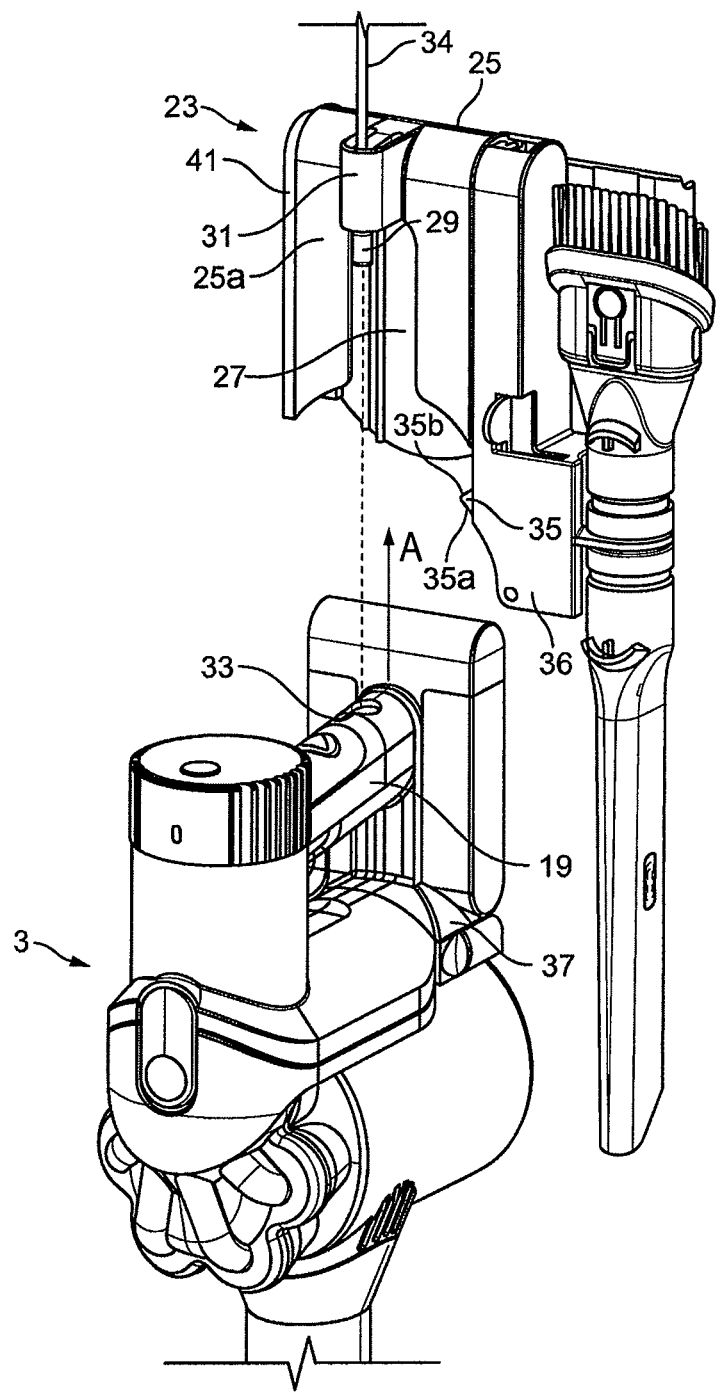
FIG. 4 is a close-up, perspective view of the docking station and part of the stick-vac cleaner, prior to docking of the stick-vac cleaner.
Figure 5:
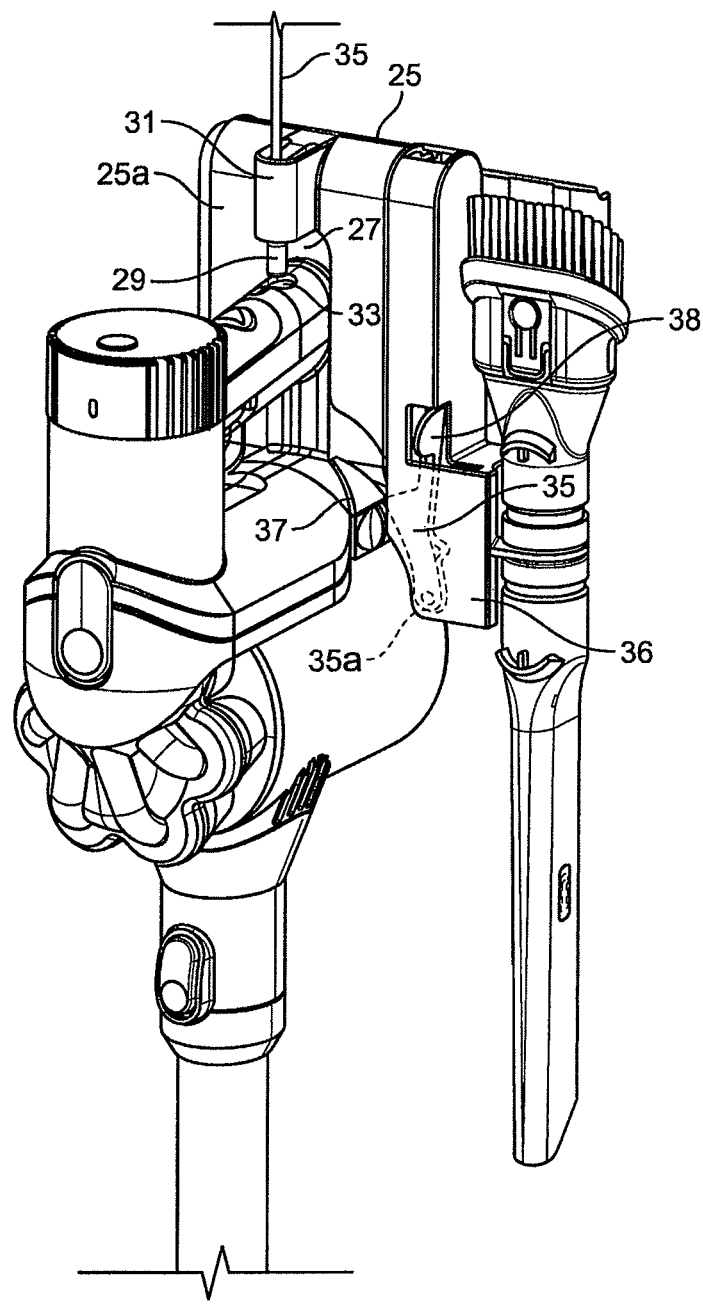
FIG. 5 is a close-up, perspective view of the docking station and part of the stick-vac cleaner, during docking of the stick-vac cleaner.
Figure 6:
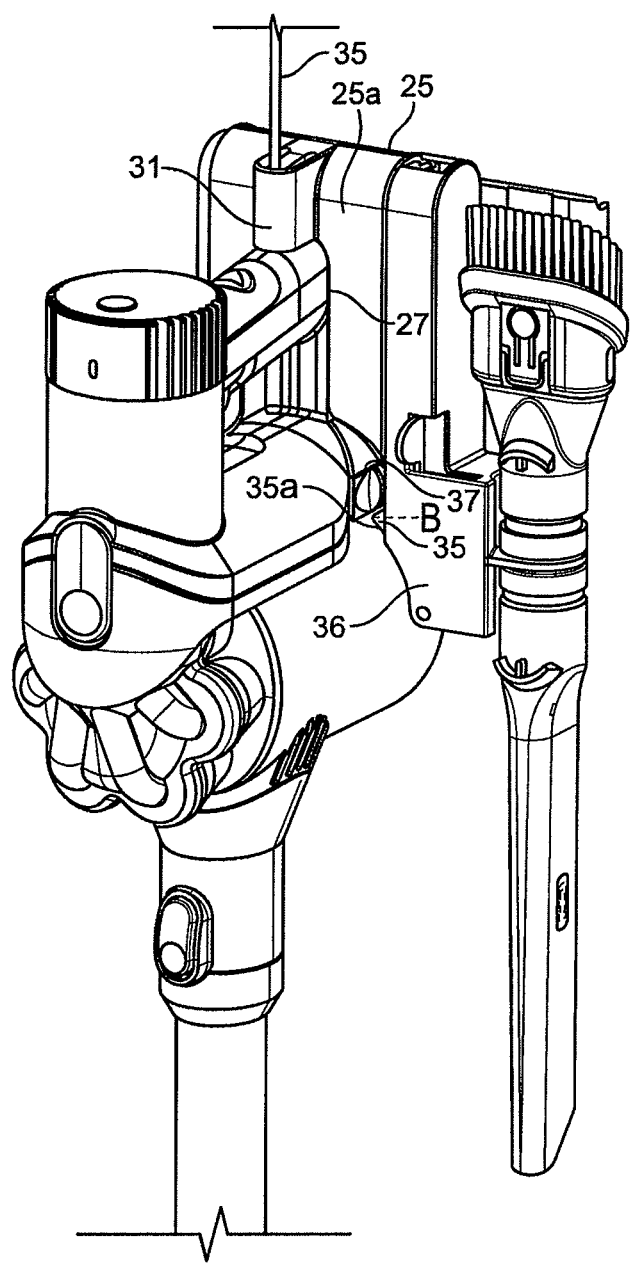
FIG. 6 is a close-up perspective view showing the docking station and part of the stick-vac cleaner, in the upright docked position.

The docking station 23 is shown in more detail in FIGS. 4 to 6, which illustrate the stick-vac cleaner immediately prior to docking, during docking and in the docked position, respectively.

The stick-vac cleaner 1 docks with the docking station 23 via the battery pack 17, which slots upwardly (in the direction A in FIG. 4) into a docking cradle 25 shaped to receive the battery pack 17 in a close sliding fit. The front wall 25a of the docking cradle 25 incorporates a blind slot 27 extending back from the entrance of the cradle 25: this blind slot 27 accommodates the handle 19 as the battery pack is inserted upwardly into the docking cradle 25.

A set of charging contacts is provided on the docking station 23 in the form of a charging jack 29, which clips into a jack holder 31 positioned adjacent the end of the slot 27. The charging jack 29 connects to a mains supply via a plug-in power cord 34 and is arranged for engagement with a corresponding set of charging contacts on the handheld cleaner 3 in the docked position, via a charging socket 33 on the back of the handle 19. Engagement of the charging jack 29 with the charging socket 33 completes a battery charging circuit for charging the stick-vac cleaner 1 in the docked position.

A catch 35 is provided to lock the stick-vac cleaner 1 securely in the docked position shown in FIG. 6.

The catch 35 is pivotally mounted on a catch housing 36 fitted to the side of the docking cradle 25 and is spring-biased towards a locking position shown in FIG. 4. During docking of the stick-vac cleaner 1, the catch 35 cooperates with a corresponding catch portion 37 on the handheld cleaner 3, which engages with a first cam surface 35a on the underside of the catch 35 to pivot the catch 35 away from the locking position shown in FIG. 4 and into the position shown in FIG. 5. As the handheld cleaner 3 is moved from the position shown in FIG. 5 to the docked position shown in FIG. 6, the catch portion 37 eventually clears the catch 35, which is then spring-biased back towards the locking position, and into locking engagement against the underside of the catch portion 37 to hold the stick-vac cleaner 1 in the docked position.

When it is docked with the docking station 23, the stick-vac cleaner 1 is laterally supported in the upright position by the side walls of the docking cradle 25. In addition, the side walls of the docking cradle 25 advantageously provide direct lateral support for the relatively heavy handheld cleaner 3.

The weight of the stick-vac cleaner 1 is effectively supported on the catch 35. Again, the catch 35 advantageously directly supports the relatively heavy handheld cleaner 3.

The manufacturing tolerances are controlled so that the catch 35 holds the charging socket 33 in engagement with the jack 29 in the docked position. Thus the battery onboard the handheld cleaner is reliably charged when the stick-vac cleaner 1 is in the upright, docked position.

Control of manufacturing tolerances may be particularly important in an arrangement such as the one shown in FIGS. 1 to 6, because the charging socket 33 faces upwards when the stick-vac cleaner is in the upright, docked position so the weight of the stick-vac cleaner tends to pull the socket 33 away from the jack 29.

The potentially negative effects of manufacturing tolerance on charging reliability can be mitigated by spring loading the charging contacts on the docking station. For example, in an alternative embodiment (not shown), the jack holder 31 may be spring-biased downwardly for ensuring positive engagement of the charging jack 29 with the charging socket 33.

In order to remove the stick-vac cleaner 1 from the docked position, a user simply releases the catch 35 using a manual release lever 38 and slides the stick-vac cleaner downwardly until the battery pack 17 disengages from the docking cradle 25. The stick-vac cleaner is then advantageously in the upright position ready for use.

In order to reduce the tendency for the catch 35 to jam in the locked position under the weight of the stick-vac cleaner 1, which might hinder manual release of the catch 35, the top side 35b of the catch 35 is ramped appropriately (see FIG. 4). Alternatively, the top side of the catch 35 may be flat (indicated very schematically by the dotted line B in FIG. 6), which has the advantage that the top side cannot then transmit any accidental lateral release force to the catch 35, for example as a result of the handheld cleaner 3 being knocked by a user in the docked position. If the weight of the stick-vac cleaner 1 tends to jam the catch 35, it may be possible nevertheless to use a flat profile catch, but provide a small amount of play to allow a user to lift the stick-vac cleaner 1 off the catch 35 prior to manual release of the catch; however, care may need to be taken to ensure that there is not sufficient play to allow the socket 33 to pull away from the jack 29 when the stick-vac cleaner is in the upright, docked position shown in FIG. 6.

This docking station 23 can be secured to the wall 21 using wall-fixing screws (not shown) which are screwed into the wall 21 through countersunk clearance holes (not visible) in the rear wall 25a of the cradle 25. Any other suitably strong conventional wall-fixings may be used to mount the docking station 23 on the wall 21, including surface fasteners such as adhesive pads or the like.

In this case, the stick-vac cleaner 1 is stored in a fully upright, docked position, with the wand 5 effectively "hanging" vertically downwards. However, this is not considered necessary to obtain the advantages of the invention, provided that the stick-vac cleaner is stored in an upright position.

Figure 7:
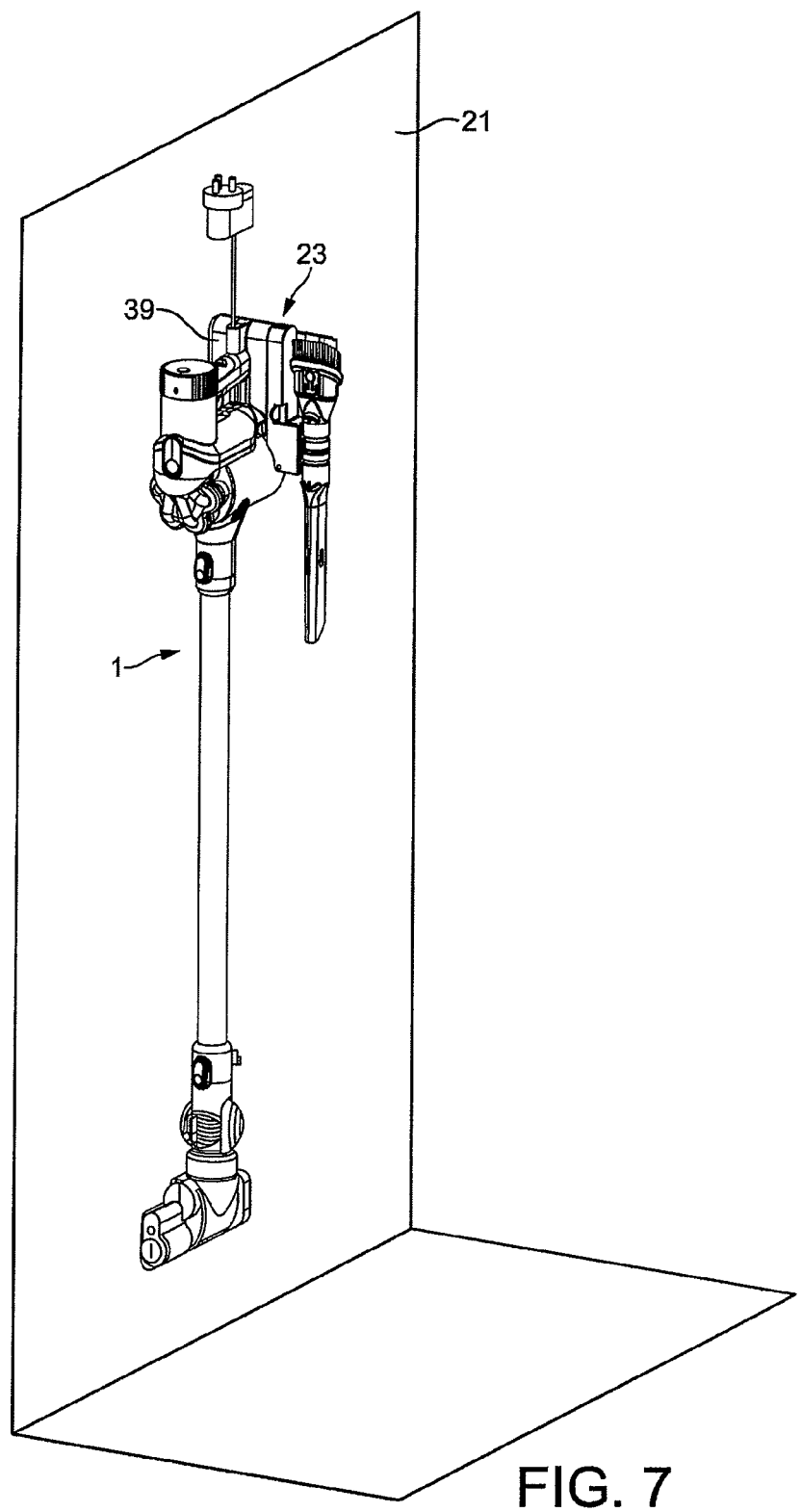
FIG. 7 is a perspective view showing a stick-vac cleaner supported in an alternative orientation, but still in an upright position, by a docking station.

FIG. 7 shows the docking station 23 mounted on the wall 21 in an alternative orientation, using a mounting bracket 39 which is secured to the wall 21 (e.g. using screws) and which is arranged to engage with a mounting lug 41 (FIG. 4) on the docking cradle 25 to support the docking station 23 on the wall.

The catch housing 36 incorporates mounting points for a crevice tool and an upholstery brush, which are retained on the catch housing in a friction-fit.

Figure 8:
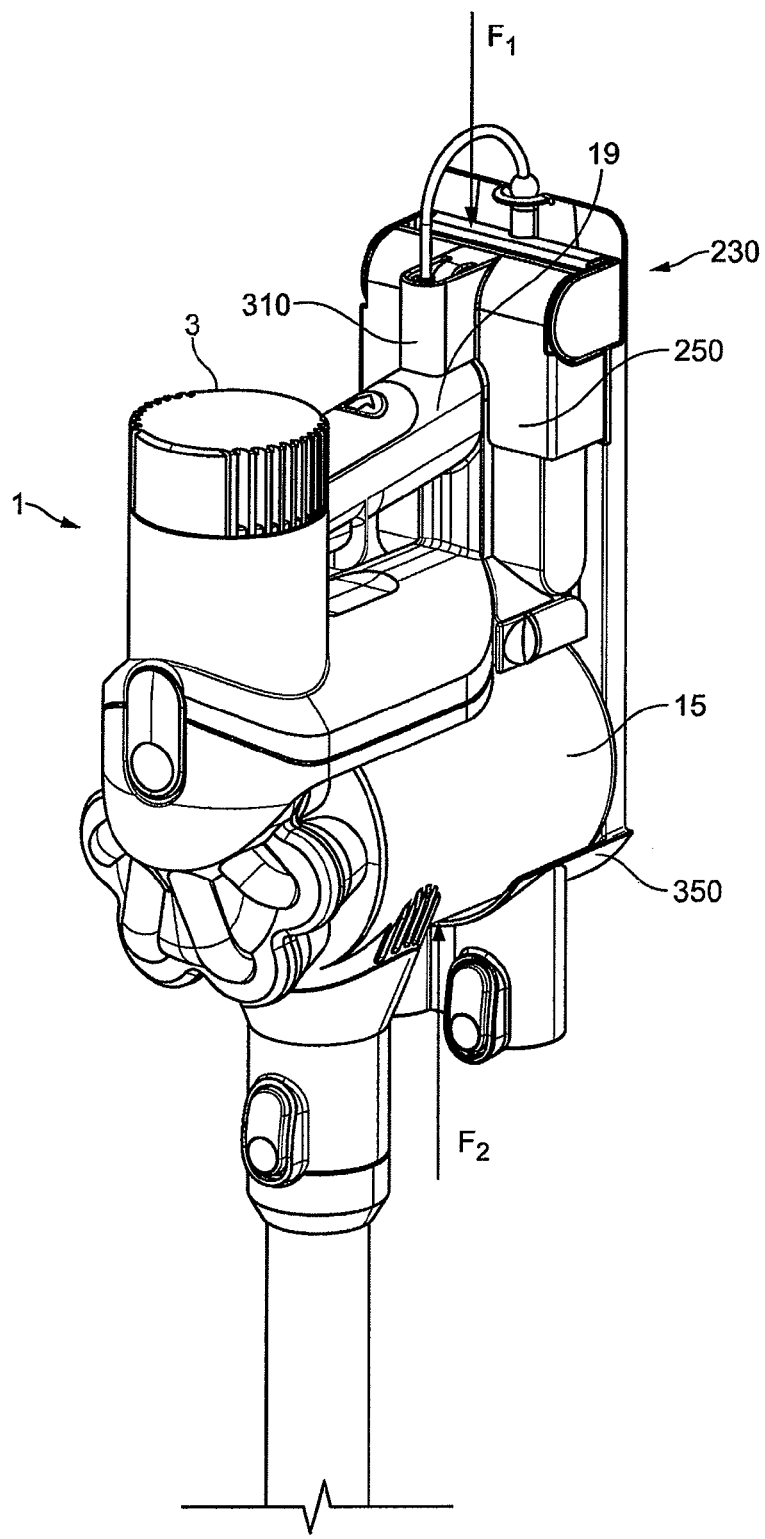
FIG. 8 is a perspective view of the stick-vac cleaner docked with an alternative docking station.

FIG. 8 shows an alternative wall-mountable docking station 230 for locking the stick-vac cleaner 1 in an upright, docked position on a wall.

In this arrangement, the handheld unit 3 is clamped securely in the upright, docked position between an upper clamping member, in the form of a docking cradle 250, and a lower clamping member, in the form of a bin support 350. The clamping load is represented in FIG. 8 by $F_1$ and $F_2$, and is in direct opposition to the weight of the cleaner.

Figure 9:
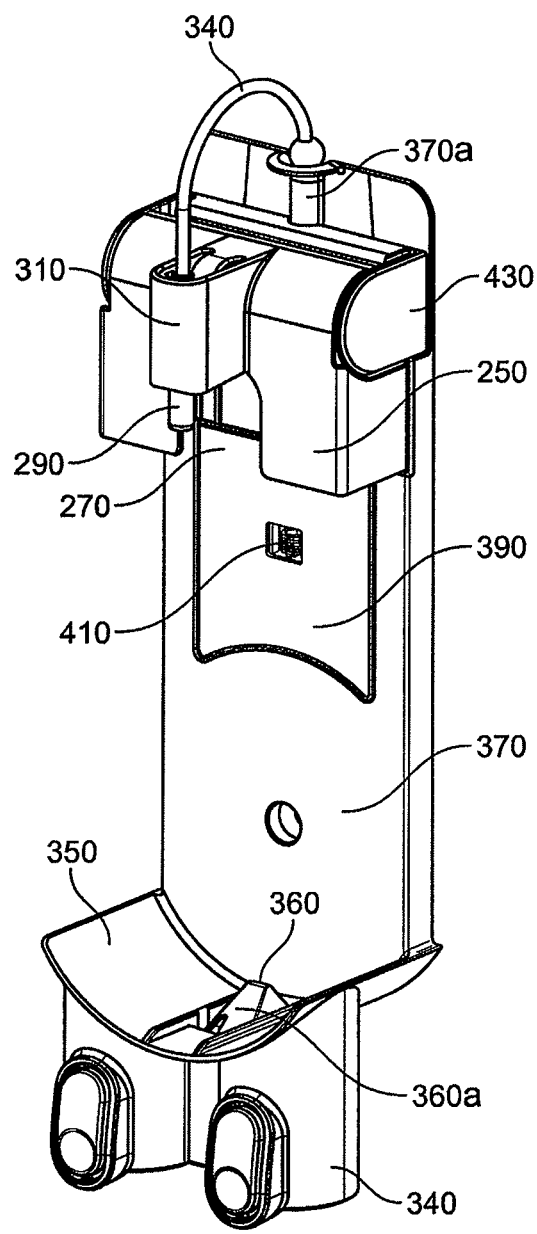
FIG. 9 is a perspective view of the alternative docking station in isolation.

The bin support 350 is fixed to a wall mounting plate 370 (FIG. 9) which in use is secured flat against the wall, in the orientation shown, using suitable wall fixings. In this particular case, the lower bin support 350 is actually formed integrally with the wall mounting plate 370, though this is not essential. A locking element 360 (FIG. 9) is provided on the bin support 350, which engages with a catch recess 15a (just visible in FIG. 11) on the front of the bin 15 to secure the bin 15 against lateral movement in the docked position. 'Universal fit' tool holders 340 are provided on the underside of the lower bin support 350 for retaining tools, or possibly the wand 5.

The docking cradle 250 is similar to the docking cradle 25, albeit shorter in length, with the docking cradle 250 likewise being arranged to receive the battery pack 17 in a close sliding fit. A blind slot 270 is provided in the front wall of the docking cradle 250 to accommodate the handle 19, and a mains-operated charging jack 290 is held within a jack holder 310, adjacent the blind end of the slot 270, for engaging the charging socket 33 on the back of the handle 19 (FIG. 8).

The docking cradle 250 is supported by a separate carriage plate 390 (FIG. 9) which can move up and down relative to the wall mounting plate 370 to vary the (vertical) separation between the docking cradle 250 and the bin support 350. A biasing spring 410 (just visible in FIG. 9 through a window in the carriage plate 390) acts between the carriage plate and the mounting plate 370 to bias the docking cradle 250 downwardly towards the bin support 350. The spring 410 thus provides a positive clamping action between the docking cradle 250 and the bin support 350 which helps to maintain a reliable electrical contact between the charging jack 290 and the charging socket 33 in the docked position.

Figure 10:
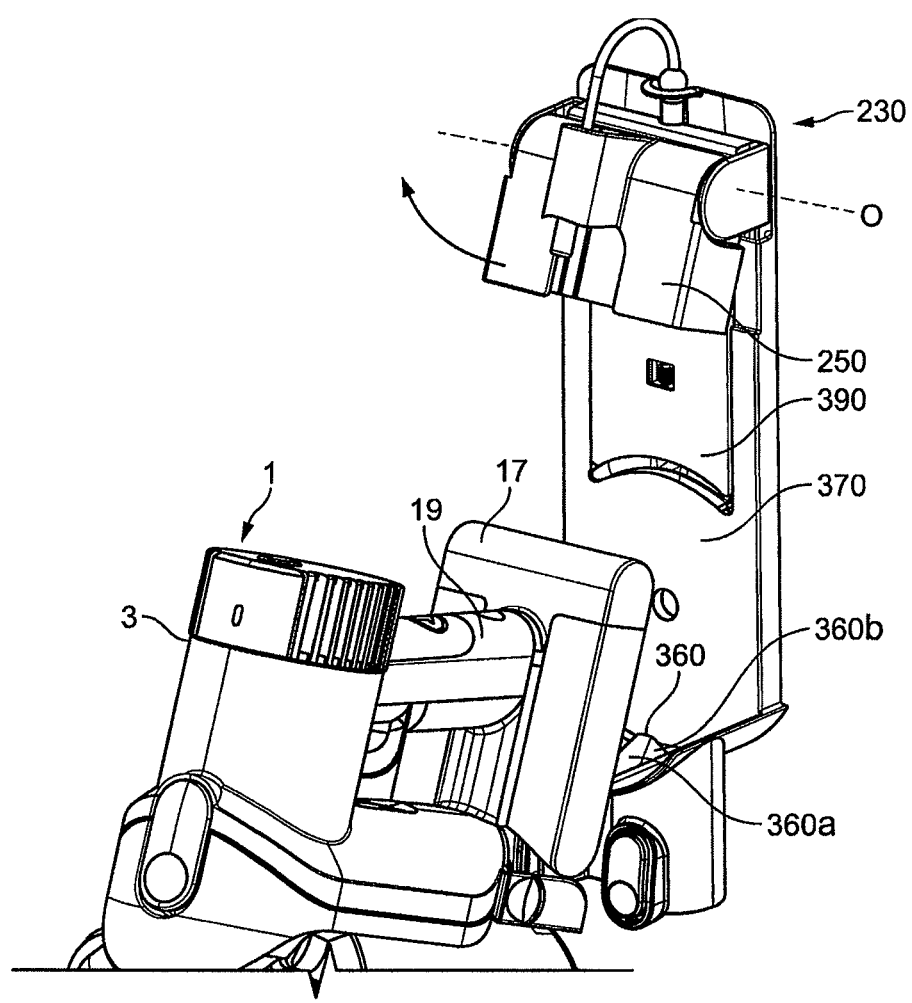
FIG. 10 is a perspective view showing part of the alternative docking station (and part of the stick-vac cleaner), illustrating pivoting movement of a docking cradle on the docking station.

The docking cradle 250 is pivotally mounted on the carriage plate 390 via a supporting yoke 430. This allows the docking cradle 250 to be pivoted away from the carriage plate 390, about the axis O, to move the docking cradle 250 out of clamping alignment with the bin support 350 (see FIG. 10).

Figure 11:
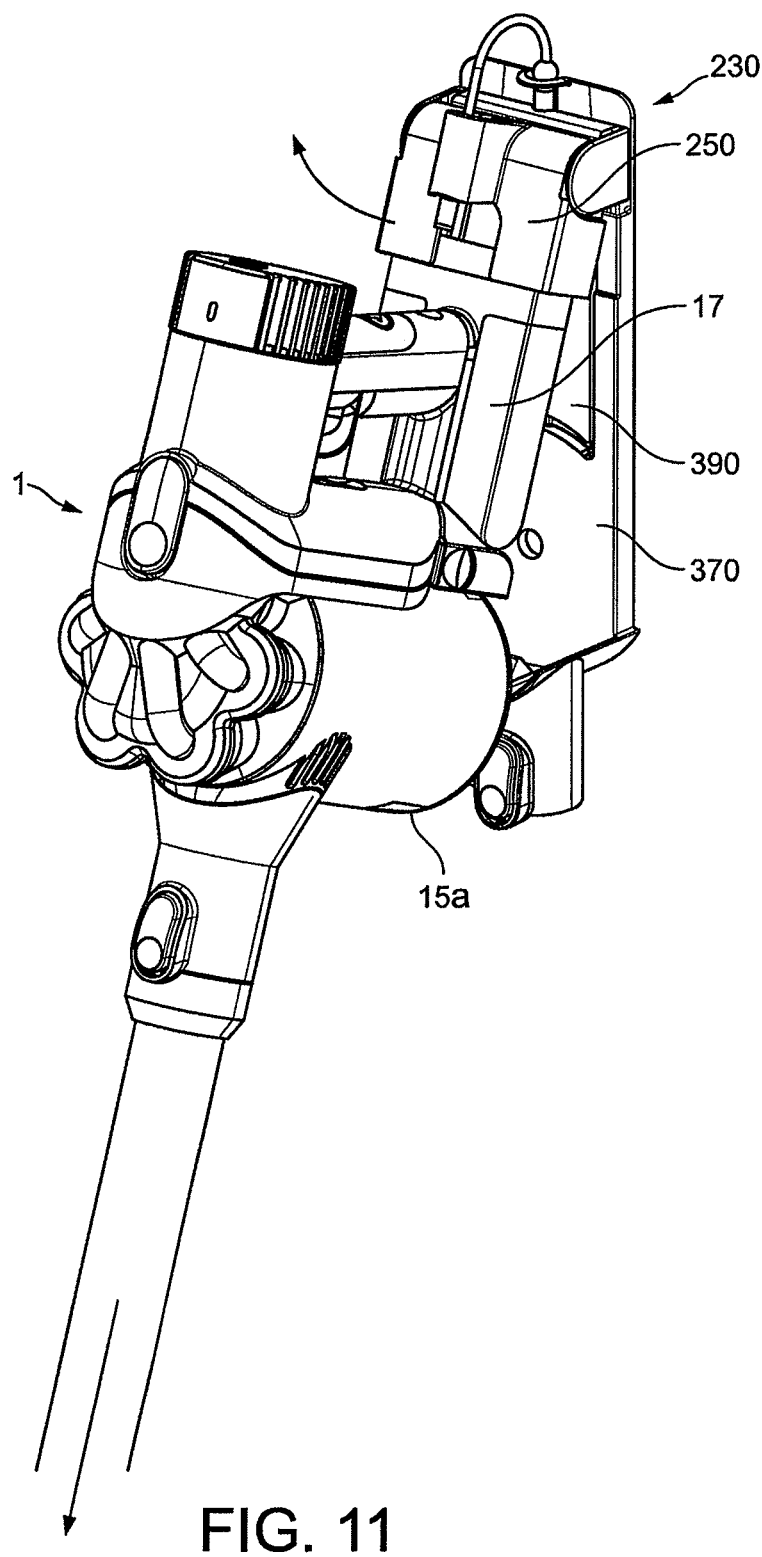
FIG. 11 is a perspective view of the stick-vac cleaner and alternative docking station, illustrating release of the stick-vac cleaner from the docking station.

To release the stick-vac cleaner 1 from the docked position shown in FIG. 8, the user grasps the stick-vac cleaner and pushes the stick-vac cleaner 1 upwards, moving the docking cradle 250 against the bias of the spring 410 until the locking element 360 clears the catch recess 15a in the bin 15. Once the locking element 360 has cleared the catch recess 15a in the bin 15, the stick-vac cleaner 1 can then be manipulated to pivot the docking cradle 250 laterally away from the mounting plate and out of clamping alignment with the bin support 350, which then allows the battery pack 17 to slide out of the docking cradle 250, past the front edge of the bin support 350, to release the cleaner 1 (FIG. 11).

Release of the stick-vac cleaner 1 from the docked position shown in FIG. 8 is a one-handed operation, in the sense that a user does not need to use one hand to hold the cleaner 1 and the other hand to operate the docking station 230 (the user may of course optionally grasp the cleaner 1 with two hands when docking or releasing the cleaner 1, and indeed the docking station 230 advantageously allows him or her to do so).

Figure 12:
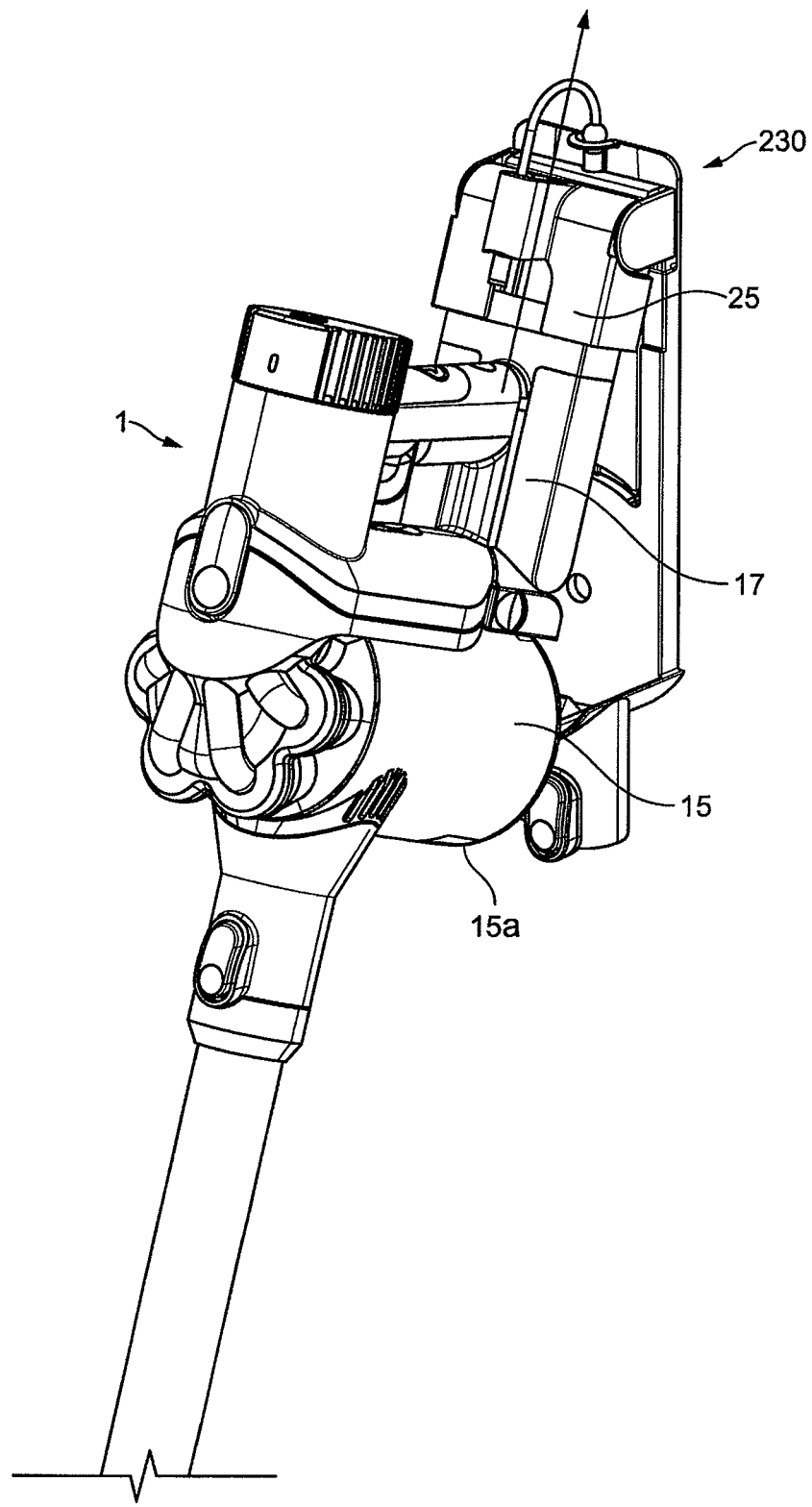
FIG. 12 is a perspective view of the stick-vac cleaner and alternative docking station, illustrating docking of the cleaner with the docking station.
Figure 13:
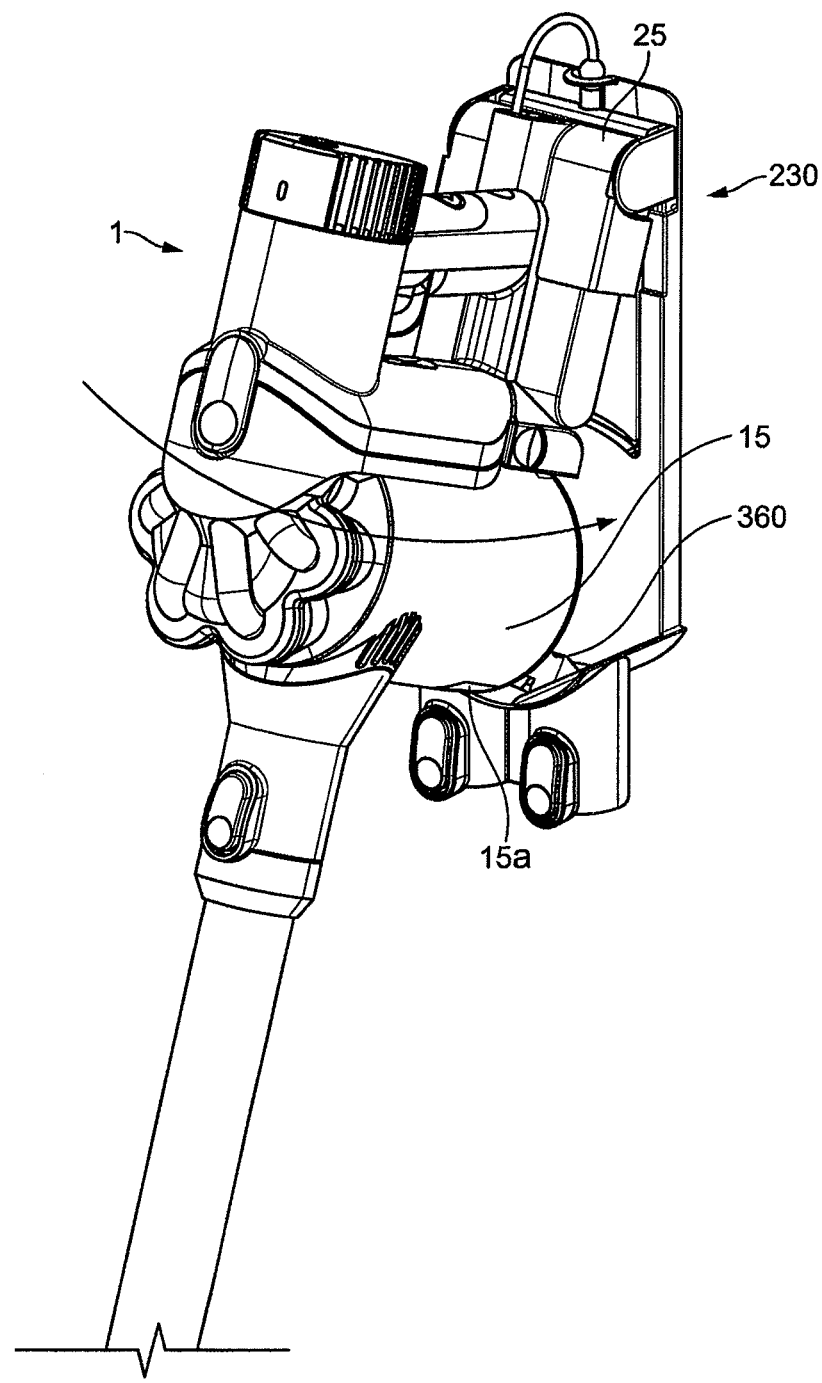
FIG. 13 is a perspective view of the stick-vac cleaner and alternative docking station, further illustrating docking of the cleaner with the docking station.

Docking of the cleaner 1 with the docking station 230 is also a one-handed operation. To dock the cleaner 1 with the docking station 230 following release of the cleaner 1, the battery pack 17 is simply slid back into the docking cradle 250 and the docking cradle 250 is then moved, using the cleaner 1, back into clamping alignment with the lower bin support 350 (FIGS. 12 and 13). In this position—once the user lets go of the cleaner 1—the cleaner 1 is automatically clamped between the docking cradle 250 and the bin support 350 under the action of the compression spring 410, with the locking element 360 engaging the catch recess 15a in the bin 15.

The plug-in power cord 340 extends down behind the mounting plate 370, through a channel 370a which is molded into the mounting plate 370. The upper end of the channel 370a is trumpet-shaped: this helps reduce stress on the cord 340 during pivoting movement of the docking cradle 250. A stop 340a is provided on the power cord 340 to prevent take up of the power cord 340 inside the channel 370a as the docking cradle 250 is pivoted about the axis O; the use of the stop 340a further reduces stress on the power cord 340 by ensuring that the length of power cord 340 remains fixed between the upper end of the channel 370a and the jack holder 290.

The locking element 360 is provided with a ramped front surface 360a (FIG. 10) to allow the bin 15 initially to bump over the locking element 360 as the docking cradle 250 is moved back into clamping alignment with the bin support 350. This simplifies the docking operation, but it is not essential. The locking element may alternatively have a flat front face, or indeed be a fixed locking element, which would then require the user to push the cleaner 1 and docking cradle 250 upwards to make sure that the bin 15 fully clears the locking element before the docking cradle 250 is moved back into clamping alignment with the bin support 350.

The docking station 230 incorporates a number of features which help reduce accidental damage to the cleaner 1 and/or docking station 230 if the cleaner 1 is subject to a lateral mechanical shock in the upright, docked position. These include the provision of ramped side surfaces (only side surface 360b is visible in FIG. 10) on the locking element 360 which allow the bin 15 to bump laterally over the locking element 360 under a lateral impact force, and also the provision of a degree of lateral 'play' between the docking cradle 250 and the carriage 390. A guide surface (for example the curved surface 350a of the bin support 350) may also be provided to guide the cleaner 1 upwards under a lateral force—so that the lateral load is taken up by movement of the docking cradle 250 vertically against the bias of the spring 410. Guide surfaces may also optionally be provided which guide the cleaner 1 under a lateral force so that the docking cradle 250 consequently rotates outwards about the axis "O", in which case the cleaner 1 may "break out" and release automatically under a sufficient lateral load.

Figure 14:
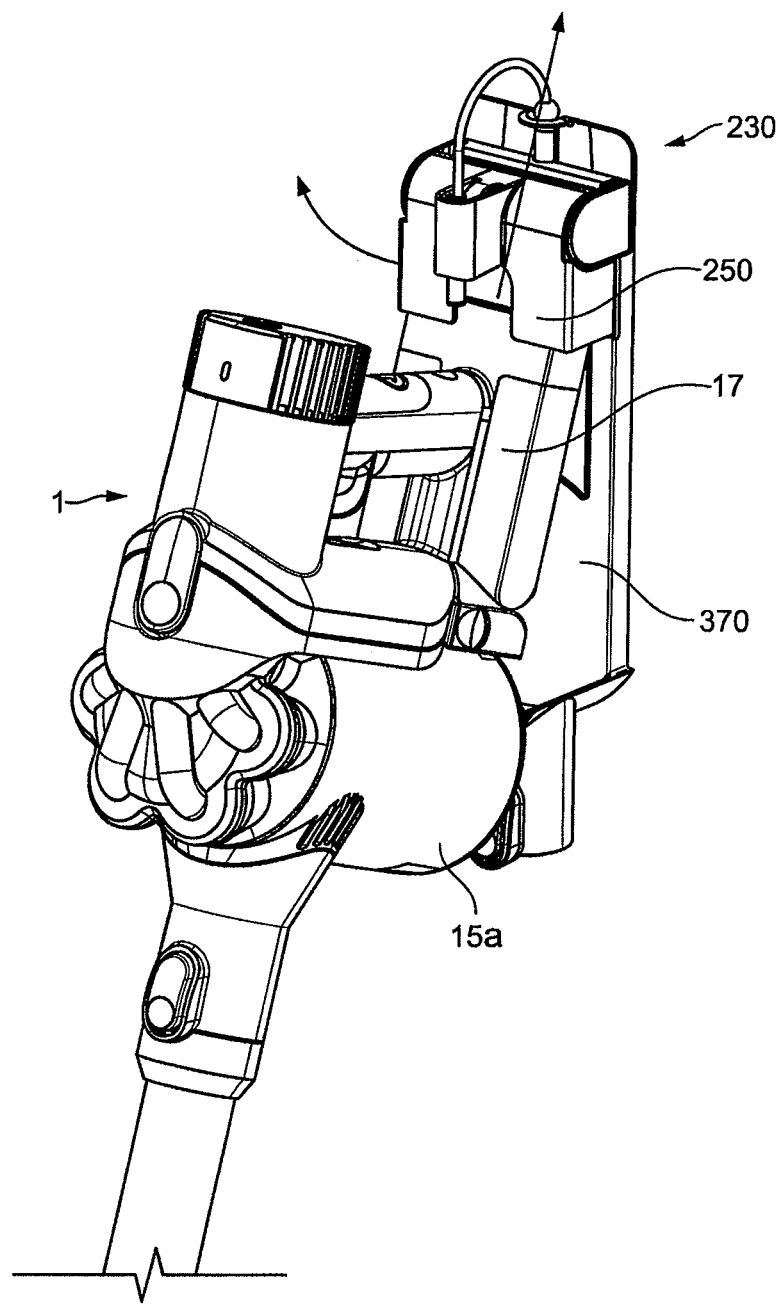
FIG. 14 is a perspective of the stick-vac cleaner and alternative docking station, illustrating insertion of the cleaner at a relatively shallow angle for initially pivoting the docking cradle into alignment with a battery pack on the cleaner.

FIG. 12 shows insertion of the battery pack 17 into the docking cradle 250 with the docking cradle 250 having already been moved out of clamping alignment with the bin support 350. In practice, following release of the cleaner 1 from the docked position the docking cradle 250 will tend to move under its own weight back into clamping alignment with the bin support 350. In this case, partially inserting the battery pack 17 into the docking cradle 250, as shown in FIG. 14, will nevertheless tend to pivot the docking cradle 250 away from the wall and into alignment with the battery pack 17, so that one-handed docking of the cleaner 1 is still possible. This "self-alignment" of the docking cradle 250 is helped in part by the relatively short length of the docking cradle 250 (cf. docking cradle 25 in FIGS. 4 to 6) which allows the battery pack 17 to be inserted into the docking cradle 25 at a relatively shallow angle. A biasing spring (not shown) could be used deliberately to bias the docking cradle 250 back into clamping alignment with the bin support 350 following release of the cleaner 1, if desired.

According to the present invention, either or both of the clamping members on the docking station may be mounted for movement relative to the wall against the action of a resilient bias. For example, in the docking station 230 the docking cradle 250 could be fixed to the wall, and the bin support 350 could be mounted for sliding movement, relative to the docking cradle 250, against the action of a biasing spring. If the upper clamping member is fixed, the lower clamping member may be moveable into and out of clamping alignment with the upper clamping member, analogous to the operation of the docking cradle 250 in FIGS. 11 to 14. In the case of the docking station 23, the catch 35 and/or docking cradle 25 may also be arranged as clamping members. For example, the catch 35 may be spring biased so that, in the locking position, the catch actually positively clamps the cleaner 1 upwardly against the docking cradle 25, with the release lever 38 being used to pivot the catch 35 out of clamping alignment with the docking cradle 25, as desired. The docking cradle 25 may likewise be spring biased to clamp the cleaner securely against the catch 35.

The movement of one of the clamping members (e.g. the docking cradle 250) into and out of clamping alignment with the other clamping member (e.g. the bin support 350) need not be a pivoting movement. For example, the docking cradle 250 could be arranged to slide laterally out of clamping alignment with the bin support 350. The use of a pivoting clamping member does, however, help minimize the foot print of the docking station.

The use of a first clamping member which can be moved into and out of clamping alignment with an opposing clamping member is advantageous, but not essential for one-handed docking and release. For example, the docking cradle 250 could alternatively be fixed to the sliding carriage plate 390 so that it is maintained at all times in clamping alignment with the fixed bin support 350. A fixed docking cradle would inhibit insertion of the battery pack to a degree; this could be mitigated to a certain extent, if desired, by minimizing the length of the docking cradle so that the battery pack 17 can be inserted into the fixed docking cradle at a very shallow angle.

The invention claimed is:

1. An arrangement comprising a stick-vac cleaner, the stick-vac cleaner comprising a handheld suction unit which is connected to a floor tool by an elongate suction wand, the arrangement further comprising a wall-mountable docking station arranged for releasably locking the stick-vac cleaner on a wall in an upright, docked position when not in use, wherein the docking station comprises an opposing pair of clamping members, at least one of the clamping members being resiliently biased towards the other clamping member for resiliently clamping the stick-vac against the other clamping member to lock the stick-vac in the upright, docked position, and wherein at least one of the clamping members is arranged for relative sliding movement with respect to the other clamping member along a clamp axis to engage the stick-vac, and at least one of the clamping members is additionally arranged for pivoting movement into and out of clamping alignment with the other clamping member.

2. The arrangement of claim 1, wherein the handheld suction unit is battery-powered and incorporates a set of exterior charging contacts connected to an onboard rechargeable battery, and the docking station comprises a respective set of charging contacts for connection to a mains supply, the charging contacts on the docking station being arranged for engagement with said exterior charging contacts on the handheld suction unit to form a battery-charging circuit when the stick-vac cleaner is in the upright, docked position.

3. The arrangement of claim 2, wherein the external charging contacts on the handheld suction unit are positioned so that they face upwards when the stick-vac cleaner is in the upright, docked position, and the charging contacts on the docking station are spring-biased for urging the charging contacts downwardly into engagement with said upward-facing charging contacts on the handheld suction unit.

4. The arrangement of claim 1, wherein said pair of clamping members consists of a lower clamping member arranged for clamping upwardly against a respective lower part of the handheld suction unit and an opposing, upper clamping member arranged for clamping downwardly against a respective upper part of the handheld suction unit.

5. The arrangement of claim 4, wherein the lower clamping member is fixed in use, relative to the wall, and the upper clamping member is resiliently biased downwards towards the lower clamping member.

6. The arrangement of claim 1, wherein, in use with the docking station mounted on a wall, said pivotable clamping member is arranged for pivoting movement away from the wall.

7. The arrangement of claim 4, wherein the upper clamping member is in the form of a docking cradle arranged to receive a first part of the handheld unit in a sliding fit, the docking cradle being slidable relative to the lower clamping member and resiliently biased towards the lower clamping member, the docking cradle additionally being pivotable away from the wall, in use, for movement out of clamping alignment with the lower clamping member in order to receive said first part of the handheld unit.

8. The arrangement of claim 7, wherein the lower clamping member is a fixed clamping member comprising a locking element for engagement with a second part of the handheld unit to secure the stick-vac against lateral movement relative to the lower clamping member.

9. A docking station for use with a stick-vac type or handheld type vacuum cleaner, the docking station being wall-mountable and arranged to releasably lock the vacuum cleaner on a wall in an upright, docked position, the docking station comprising an opposing pair of clamping members, at least one of the clamping members being resiliently biased towards the other clamping member for resiliently clamping the stick-vac against the other clamping member to lock the stick-vac in the upright, docked position, and wherein at least one of the clamping members is arranged for relative sliding movement with respect to the other clamping member along a clamp axis to engage the stick-vac, and at least one of the clamping members is additionally arranged for pivoting movement into and out of clamping alignment with the other clamping member.

* * * * *